United States Patent [19]
Lee et al.

[11] Patent Number: 6,086,820
[45] Date of Patent: Jul. 11, 2000

[54] METHOD FOR PRODUCING ELECTRODES FOR NI/METAL HYDRIDE ALLOY SECONDARY CELLS

[75] Inventors: Jai Young Lee; Kuk Jin Jang; Jae Han Jung; Dong Myung Kim; Ji Sang Yu; Sang Min Lee; Jeong Gun Park; Ho Lee, all of Taejeon, Rep. of Korea

[73] Assignee: Korea Advanced Institute of Science & Technology, Rep. of Korea

[21] Appl. No.: 09/060,277

[22] Filed: Apr. 14, 1998

[30] Foreign Application Priority Data

Apr. 23, 1997 [KR] Rep. of Korea ...................... 97-15226

[51] Int. Cl.[7] ...................................................... B22F 3/02
[52] U.S. Cl. ................................................. 419/66; 419/61
[58] Field of Search ..................................... 427/216, 217; 419/61, 66

[56] References Cited

U.S. PATENT DOCUMENTS

| | | | |
|---|---|---|---|
| 5,104,753 | 4/1992 | Sakai et al. | 429/40 |
| 5,387,478 | 2/1995 | Muta et al. | 429/59 |
| 5,569,563 | 10/1996 | Ovshinsky et al. | 429/223 |
| 5,571,636 | 11/1996 | Ohta et al. | 429/218 |
| 5,879,429 | 3/1999 | Yamamura et al. | 75/332 |

OTHER PUBLICATIONS

T. Sakai et al., "Rare–earth–based Alloy Electrodes for a Nickel–Metal Hydride Battery," *Journal of the Less–Common Metals*, 172–174 (1991), pp. 1175–1184.

Jon–Ha Lee, Abstract of Ph.D. Thesis entitled "A Study on the Self–Discharge Characteristics of a Sealed Nickel–Metal Hydride Battery," Korean Advanced Institute of Science and Technology, Nov. 29, 1994.

H. Sawa et al., "Electrochemical Properties of Zr–V–Ni System Hydrogen–Absorbing Alloys of Face–Centered Cubic Structure", *Materials Transactions, JIM*, vol. 31, No. 6 (1990), pp. 487–492.

*Primary Examiner*—Daniel J. Jenkins
*Attorney, Agent, or Firm*—Hickman Stephens Coleman & Hughes, LLP

[57] ABSTRACT

A method for producing an electrode of Ni/metal hydride alloy secondary cells. The electrode may be produced by mixing an active material with approximately 10–50 wt % of Cu powders, which can serve as a binder as well as a current collector, and cold-pressing the mixture at a pressure of 10 ton/cm. As the Cu-compacted electrode continues to experience the cycle of charge and discharge, the desolution-deposition of Cu is gradually produced. This desolution-deposition of Cu allows Cu to be deposited on the surface of the electrode comprising the hydrogen storage alloy, so that the electrode can be similar to a conventional Cu-electroless plated electrode in surface morphology. Consequently, the method of the invention can be an alternative for conventional electroless plating, which significantly improves the general functions of hydrogen storage alloy electrode, including low temperature dischargeability and high rate capability, without producing pollution of the environment.

2 Claims, 11 Drawing Sheets

METHOD FOR PRODUCING ELECTRODES FOR NI/METAL HYDRIDE ALLOY SECONDARY CELLS

BACKGROUND OF THE INVENTION

1. Field of the Invention

The present invention relates, in general, to a method for producing hydrogen storage alloy electrodes for Ni/metal hydride (MH) secondary cells and, more particularly, to an improvement in the general functions of the cells without producing pollution of the environment, along with the method.

2. Description of the Prior Art

Hydrogen storage alloys are the metals or alloys which are able to absorb or discharge hydrogen reversibly at certain temperatures under certain pressures. In order for the hydrogen storage alloys to be applied in practice, they are required to show large hydrogen storage capacities which are reversibly available as well as to show rapid hydrogenation in electrolytes.

The hydrogen storage alloys for Ni/MH secondary cells, developed thus far, can be exemplified largely by two types: $AB_5$ type including Mm-Ni, wherein A is an element having a high affinity for hydrogen, that is, a rare-earth element, such as La, Ce, Ti, Zr, etc, and B is a transition metal or transition metals selected from Ni, Mn, Co, Fe, Al, etc; and $AB_2$ type including Zr-Ni and Ti-Ni. The former $AB_5$ type is disadvantageous in that its energy storage density is low while the latter $AB_2$ type is poor in its general functions.

In developing anode materials for Ni/MH cells, extensive research has been focused on the $AB_5$ type hydrogen storage alloys and has resulted in $MmNi_5$ type alloys with an electrochemical discharge capacity of about 200–300 mAh/g.

However, the miniaturization of electronic equipment requires alloys which are of higher discharge capacity and better electrode life span than the conventional $MmNi_5$ type alloys. This requirement is also raised by the development of electric vehicles which demand high capacity and high performance batteries. To develop the alloys which meet the requirement, the research direction has recently turned toward $AB_2$ type Laves phase alloys which are now known to be of higher discharge capacity than conventional $AB_5$ type alloys.

Thus, in order to develop the Ni/NH secondary cells which are of high capacity and high performance, it is necessary to research for the high performance of the $AB_5$ type hydrogen storage alloys for which higher capacity is secured than for the $AB_2$ type hydrogen storage alloys.

All of an electrode's functions including activation properties, low temperature dischargeability, dependence on current density, and electrode's life span, were found to be greatly dependent on electrode-producing methods as well as the properties of hydrogen storage alloys as they are.

Improvement of the anodes for Ni/MH secondary cells is largely accomplished by amelioration of active materials themselves and/or by additives. The amelioration, which aims to maximize the properties the active materials themselves have, comprises the change in alloy composition (alloy design) and the modification of alloy surface through, for example, electroless plating. For the additives, current collectors, such as Cu and Ni, and binders, such as polytetrafluoroethylene (hereinafter referred to as "PTFE") and PVA powders, may be used.

T. Sakai et al., reported in J. Less-Common Metals, 172–174(1991) 1135 that The low temperature dischargeability and current density dependence of electrodes can be improved by electroless plating Ni or Cu on their surfaces. The electroless plating processes suggested by T. Sakai et al., however, are complicated and produce pollution of the environment owing to their toxic by-products.

A method for improving the general functions of electrodes by changing the properties that active materials themselves have, rather than by the additional processes, such as electroless plating, is disclosed in Mat. Trans, JIM, 31 (1990) 487 by H. Sawa et al. According to the disclosure, the content of Ni in a hydrogen storage alloy is increased from the start of the alloy's design. However, the discharge capacity of the electrode is found to decrease with Ni content.

Lee et al., reported in Ph. D. thesis, KAIST, Taejon, Korea (1995) that the surfaces of electroless-plated alloy powders are coated with Cu or Ni particles less than 10 $\mu$m in size. This electroless plating can extend the life span of electrodes by preventing the electrodes from being in direct contact with electrolytes. Other significant advantages of the electroless plating are that the plated alloys are improved in moldability and electroconductivity. However, the functional improvement of the electrodes is difficult to control because the size of the plated particles, a main factor to determine the functions, is changed depending on the conditions of the plating processes.

SUMMARY OF THE INVENTION

In order to solve the aforementioned problems, the present inventors have recognized that there exists a need for a novel modification method of the electrodes for secondary cells, which does not alter the characteristic properties of the active materials and produce pollution of the environment and can easily control the functions of the electrodes.

Therefore, it is an object of the present invention to provide a method for producing an electrode for Ni/metal hydride alloy secondary cells, by which the electrode can be significantly improved in general functions, including rate capability, low temperature dischargeability, etc.

It is another object of the present invention to provide a method for producing an electrode for Ni/metal hydride alloy secondary cells, which does not produce pollution of the environment.

In accordance with the present invention, there is provided a method for producing an electrode for Ni/metal hydride alloy secondary cells, utilizing a desolution-deposition reaction of Cu to modify the surface of the Ni/metal hydride alloy.

BRIEF DESCRIPTION OF THE DRAWINGS

The above and other objects and aspects of the invention will become apparent from the following description of embodiments with reference to the accompanying drawings in which:

FIG. 9a is SEM photographs showing the surface of pure Cu electrodes before potential sweeping while

DETAILED DESCRIPTION OF THE INVENTION

The present invention pertains to a surface modification of the $AB_2$ type hydrogen storage alloys, with which anodes for high capacity and high performance Ni/MH secondary cells can be produced.

In the experiments the inventors have performed, Cu and Ni powders were used as compacting materials for electrodes. The Cu-compacted electrodes and the Ni-compacted, thus obtained, each were tested for current density dependence and low temperature dischargeability and their exchange current density and impedance were also measured. Based on the data taken together, the surface modification method for improving the electrodes was yielded.

An alloy $Ti_{0.7}Zr_{0.3}Cr_{0.3}Mn_{0.3}V_{0.6}Ni_{0.8}$ was prepared by arc-melting under an Ar atmosphere. Button type specimens were pulverized in the air and were sieved to select the powders in a size of 325–400 mesh. 0.2 g of the powders were subjected to electrode tests. In preparing electrodes, either one of Ni and Cu powders were used.

Where a Ni powder was selected, the hydrogen storage alloy powder, a Ni powder (<10 $\mu$m), and a PTFE powder which played a role as a binder, were mechanically mixed. Ni and PTFE were each added at an amount of 10% by weight to 0.2 g of the hydrogen storage alloy powder. For Cu powder, it was added at an amount of 50% by weight without using a binder.

Finally, the mixed electrode powders were cold-pressed at a pressure of 10 ton/cm² to give pellets, The pellets were subjected to half cell testing.

After being charged at a charge current density of 50 mA/g for 10 hrs, the discharge behavior of the alloy electrodes was observed until the cells discharged at a discharge current density of 50–700 mA/g to an end potential of −0.75 V(vs Hg/HgO).

For their low temperature dischargeabilities, % dischargeability was observed at 0, 25 and 60° C. under the condition of a charge/discharge current density of 50 mA/g.

In order to detect the difference in the electrochemical state between the Ni- and the Cu-compacted electrodes, the measurement of exchange current density was performed by a linear polarization method. In this regard, the polarization resistance implicated in the reaction of the electrodes was measured by using an electrochemical impedance spectroscopy.

A cycle voltammetry experiment was conducted to determine whether the electrochemical reaction of pure Cu can be produced in a range of −0.75 to −1.1 V (vs Hg/HgO).

Figure 1:
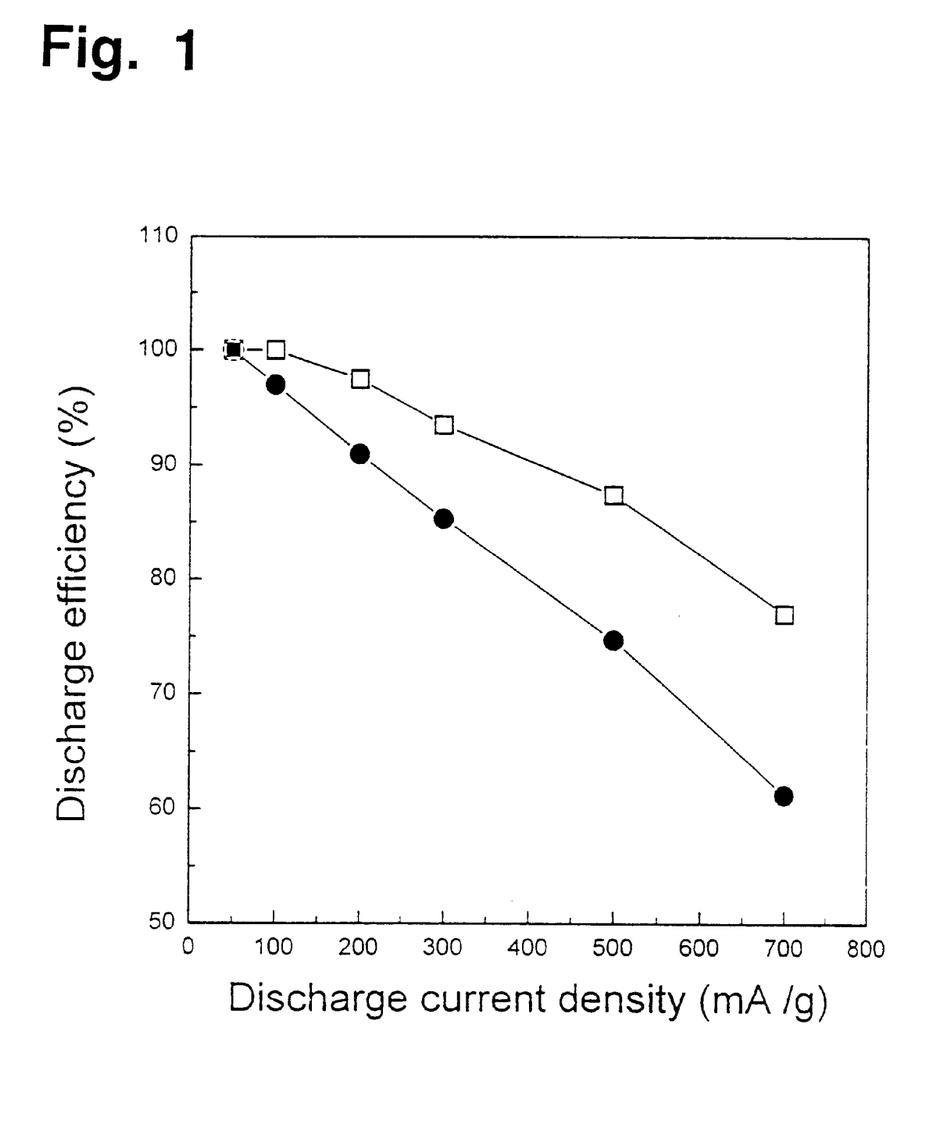
FIG. 1 is a plot showing the rate capability of Cu-compacted electrodes at 30° C., depending on the size of the Cu powders used.
Figure 2:
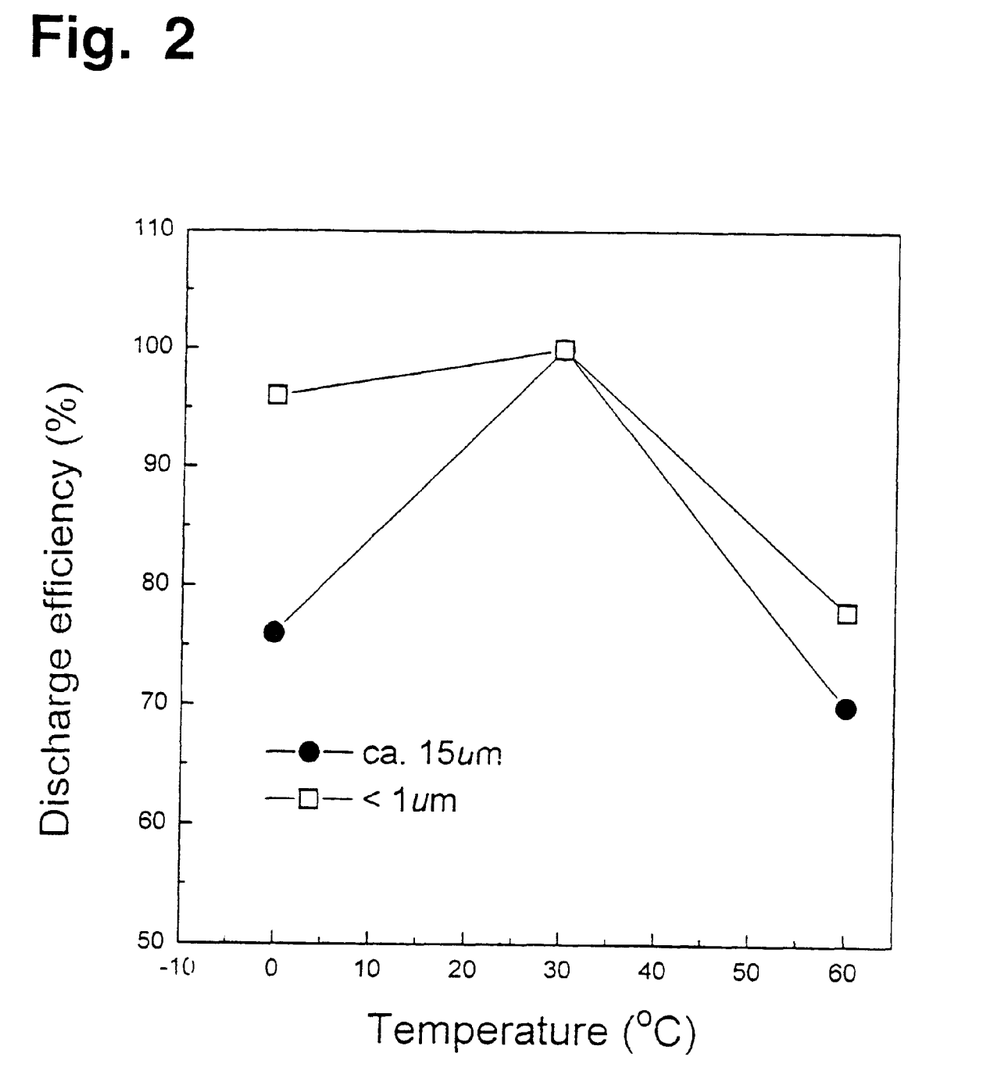
FIG. 2 is a plot showing the low temperature dischargeability of Cu-compacted electrodes, depending on the size of the Cu powders used.

FIGS. 1 and 2 show the rate capability and the low temperature dischargeability of the Cu-mixed electrodes, respectively, depending on the sizes of the Cu powders. As shown in FIG. 1, the electrode exhibits 80% or more of the maximal discharge capacity at a discharge current density of 2C rate (700 mgh/g) when the Cu powder is 1 $\mu$m or less in size. Also, the use of the Cu powder with a size of 1 $\mu$m or less is advantageous in an aspect of low temperature rate dischargeability. The electrode comprising such a Cu powder exhibits 90% or more of its maximal discharge capacity at 0° C.

Figure 3:
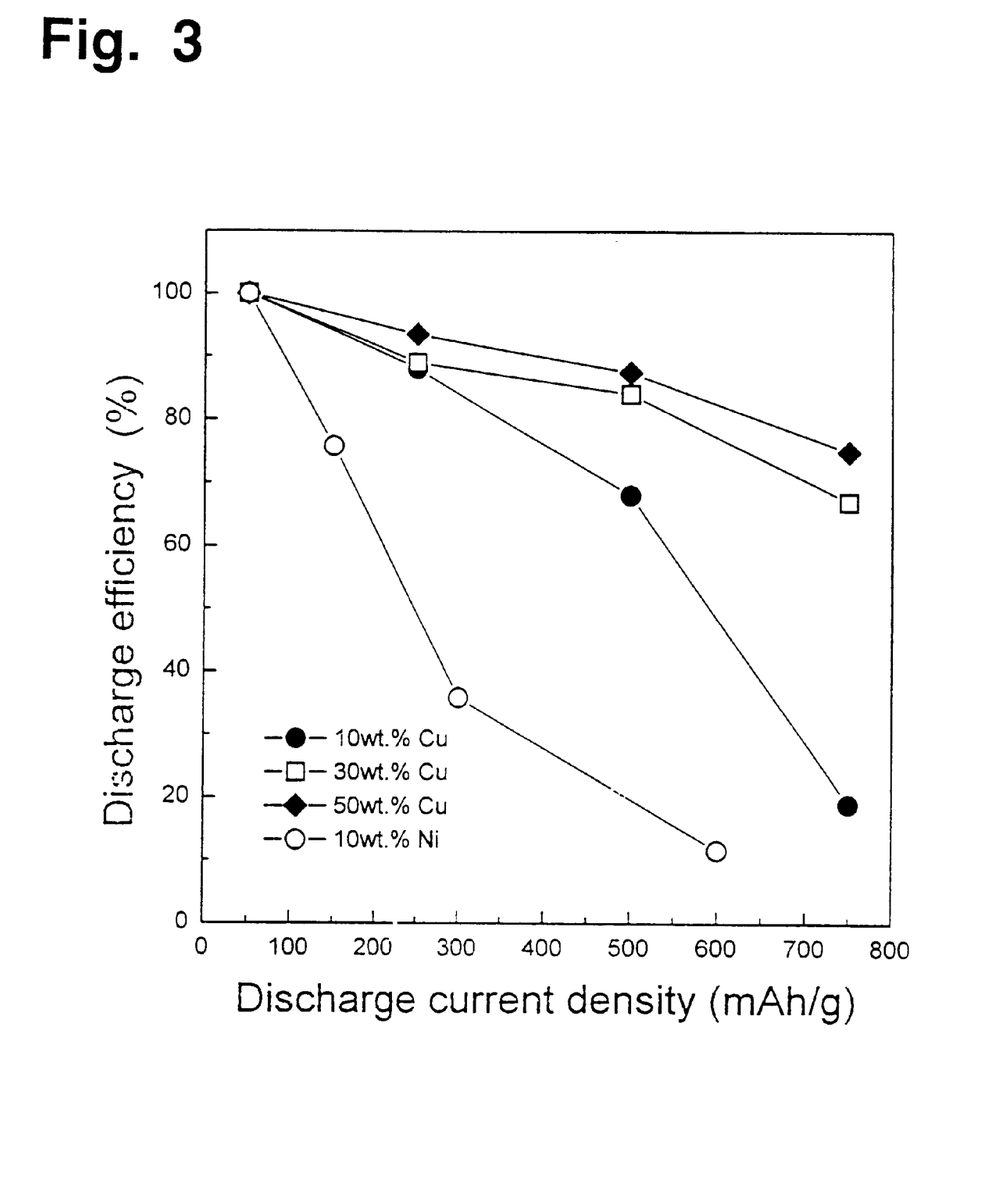
FIG. 3 is a plot showing the rate capability of Cu-compacted electrodes at 30° C., depending on the size of the Cu powders used, together with that of a 10 wt % Ni-compacted electrode.
Figure 4:
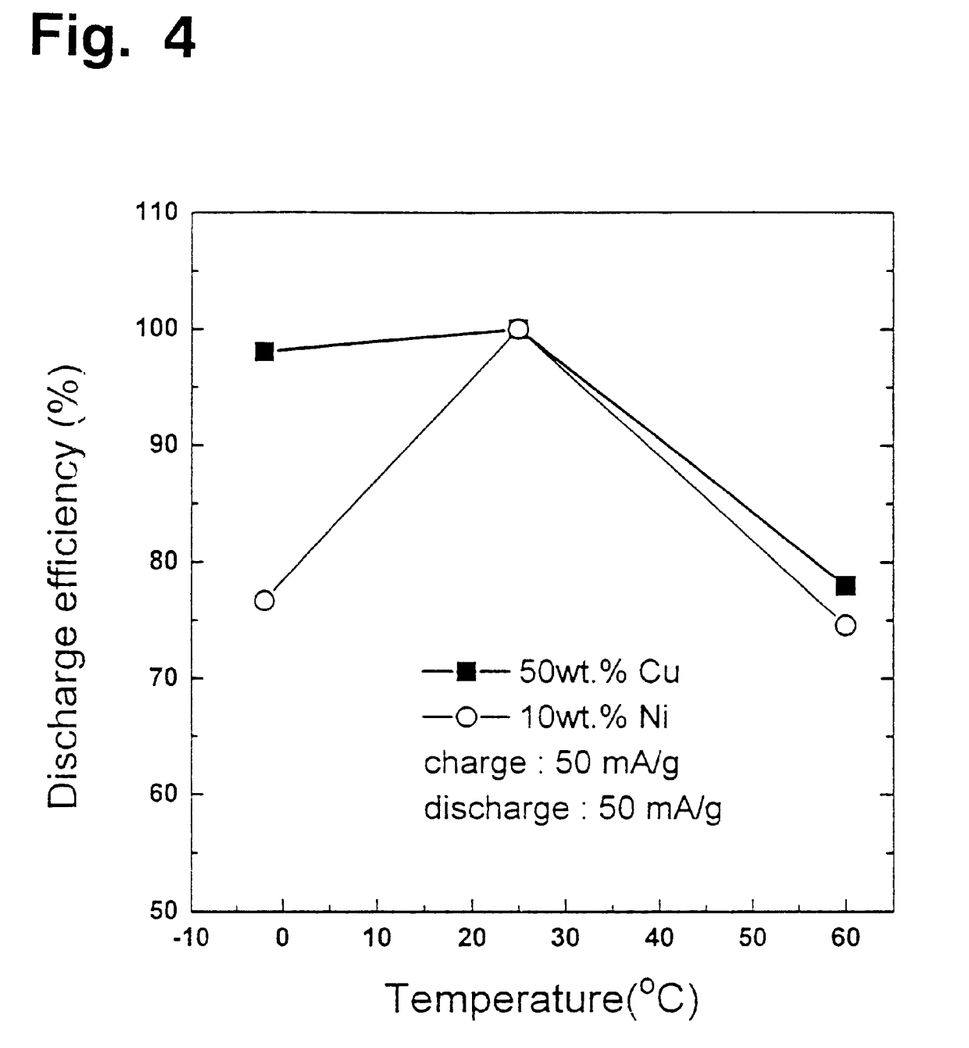
FIG. 4 is a plot showing the low temperature dischargeability of a 50 wt % Cu-compacted electrode as compared with that of a 10 wt % Ni-compacted electrode.

The relation of the electrode's properties, rate capability and low temperature dischargeability, with the amount of the Cu powder as small as or smaller than 1 $\mu$m in size, was also investigated, and is given together with the data obtained by using a Ni powder, as shown in FIGS. 3 and 4. From the data in FIG. 3, it is apparent that the rate capability of the electrodes becomes maximized from 30% by weight of the Cu powder. In fact, the optimal amount of the Cu powder is approximately 50% by weight when taking into account the energy density upon the practical preparation of cells.

Figure 5:
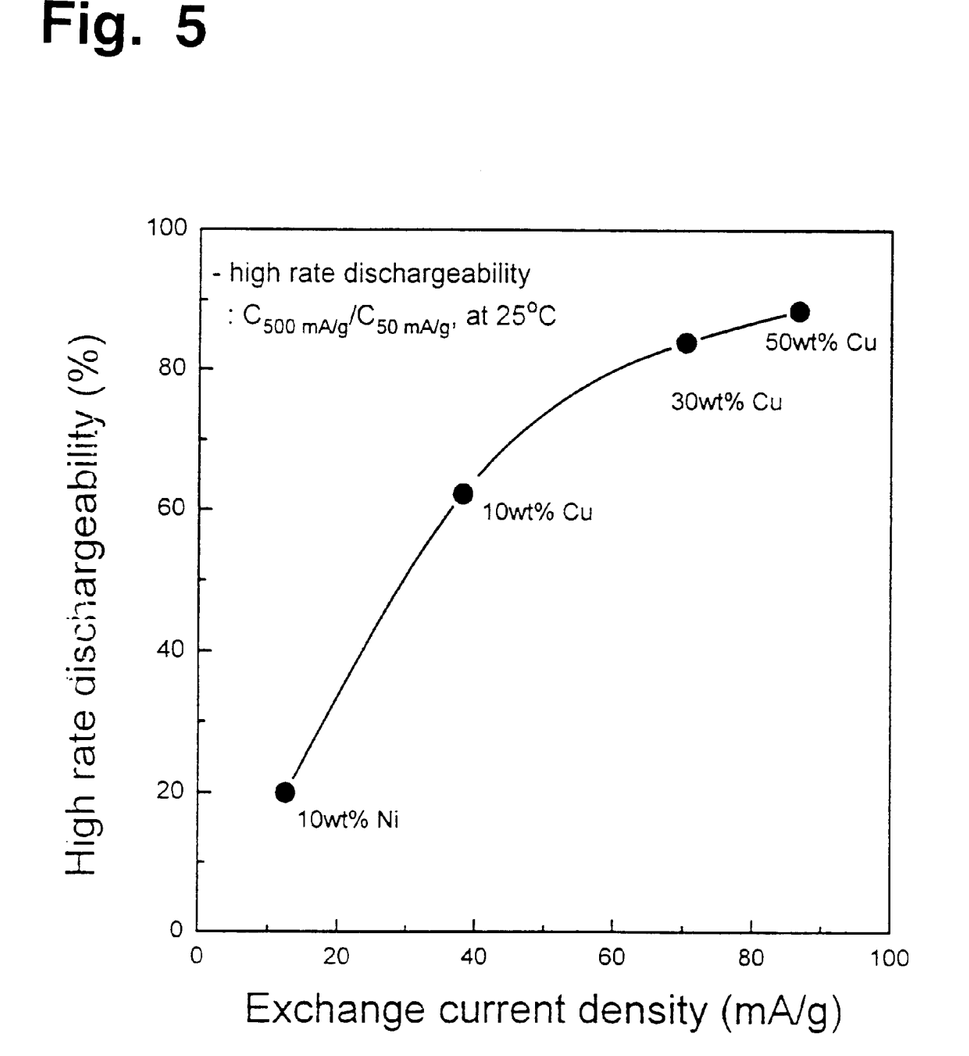
FIG. 5 shows the relation of rate capability with exchange current density in Ni- or Cu-compacted electrodes, depending on the amount of Ni or Cu.

The reason why the rate capability and the low temperature dischargeability are improved as the amount of Cu increases, is that the exchange current density of the electrodes increases with the Cu added, as shown in FIG. 5. Because, the exchange current density is largely determined by the charge transfer reaction rate on an electrode surface, a high exchange current density means a high charge transfer reaction velocity.

Figure 6:
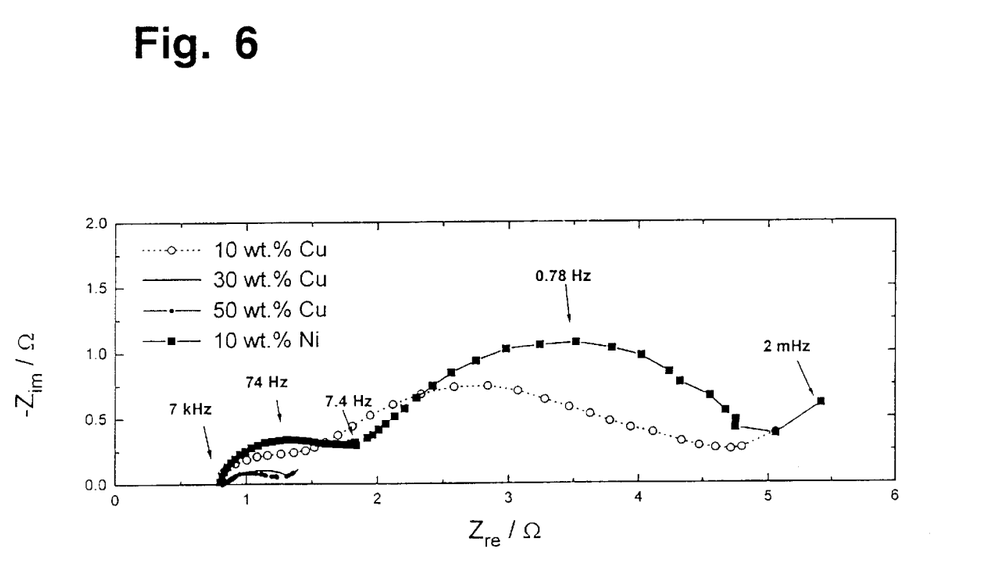
FIG. 6 is a cole-cole plot showing the impedance of Ni- or Cu-compacted electrodes measured at 50% depth of discharge.

The same results with those of FIG. 5 were also obtained by the EIS data of FIG. 6, which shows that the polarization resistance upon electrode reaction, including contact resistance and surface reaction resistance, is very small as the amount of Cu increases.

Figure 7A:
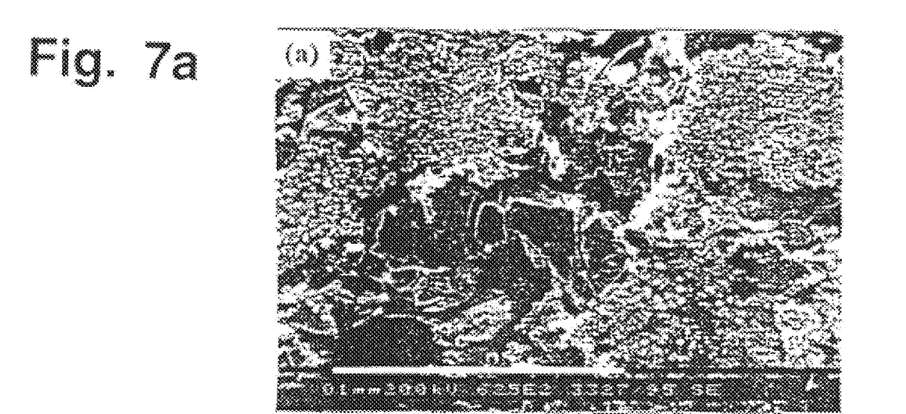
FIGS. 7a to 7c are photographs taken by a scanning electron microscope (SEM), showing the surfaces of Cu-compacted electrodes in FIGS. 7a and 7b and the surface of a Ni-compacted electrode in FIG. 7c.
Figure 7B:
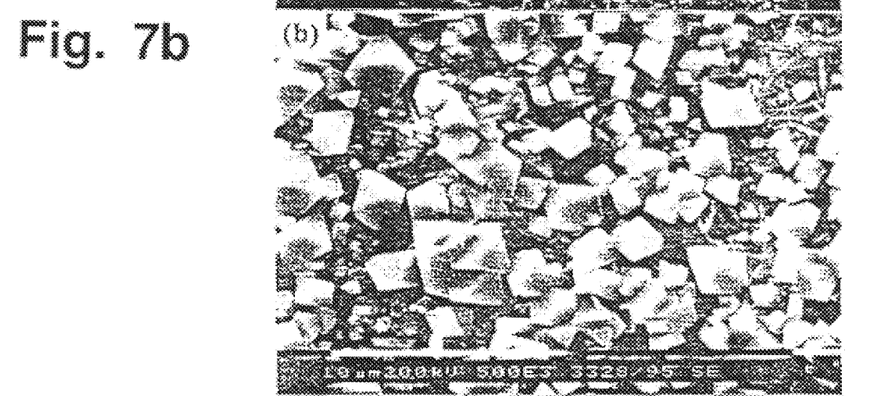
Figure 7C:
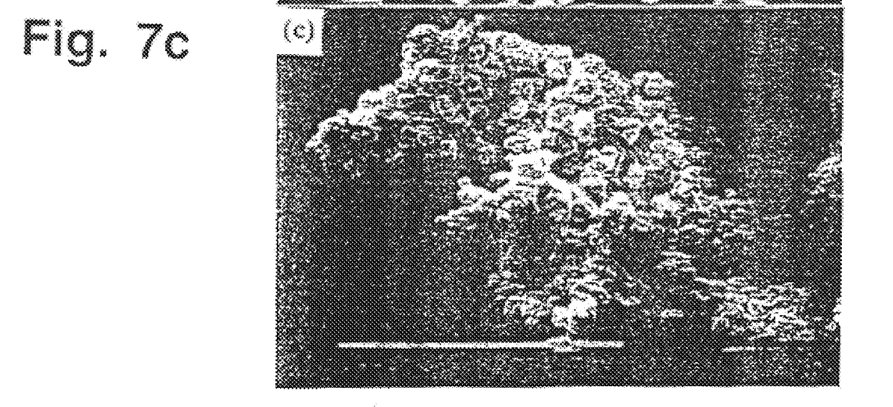

With reference to FIG. 7, there are scanning electron microphotographs showing the surfaces of the electrodes after cycles of charge/discharge. FIGS. 7a and 7b are photographs for the electrodes in which 50% by weight of Cu powder is mixed. On the surface of these electrodes are fine particles and needle-shaped deposits 2–3 $\mu$m in size, which were found to be Cu powders as analyzed by EDS. FIG. 7c shows the structure of the electrode surface on which 50% by weight of Cu is coated by electroless-plating. From these photographs, it is apparent that the desolution-deposition of Cu is progressed in the Cu-compacted electrodes during the cycles of charge and discharge.

Figure 8A:
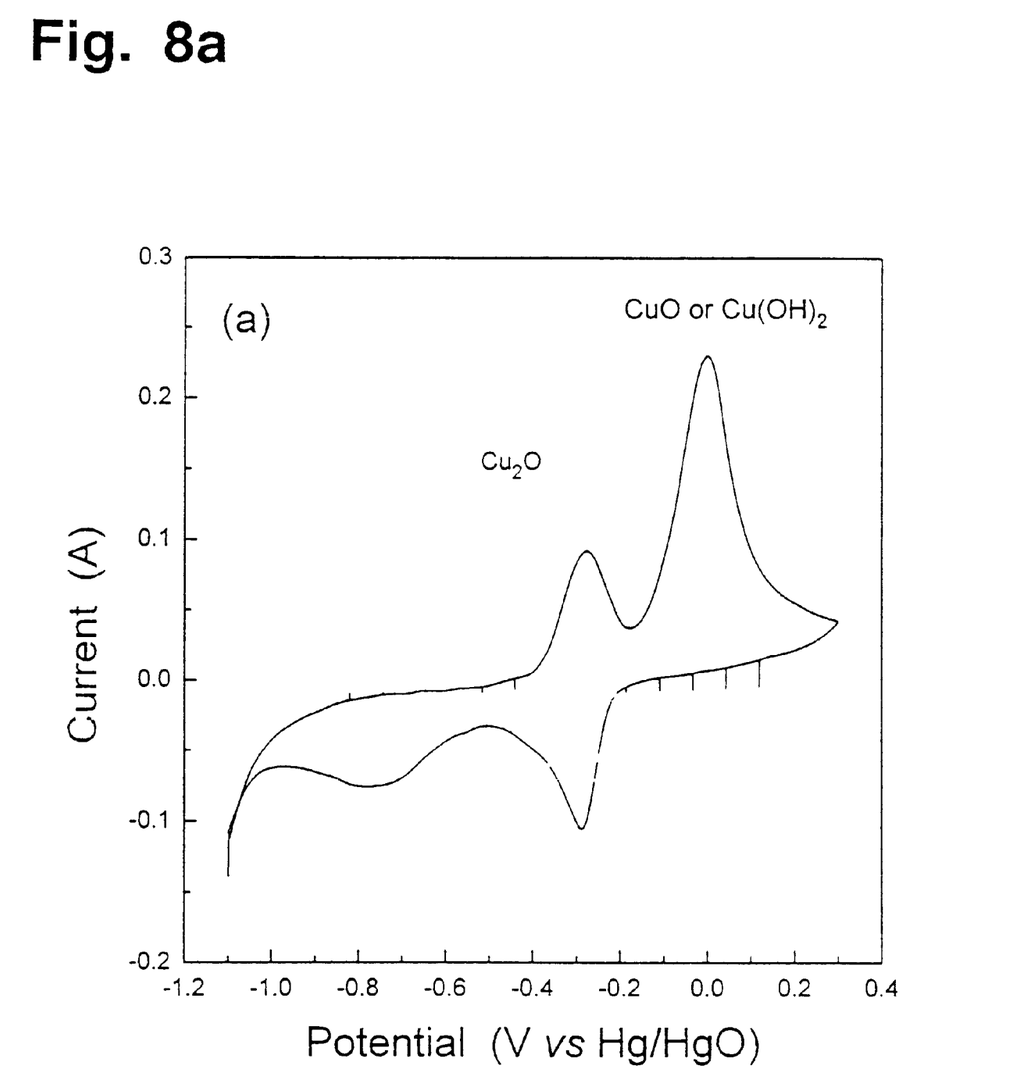
FIGS. 8a and 8b are the cyclic voltamograms of a pure Cu electrode, which are obtained by sweeping a pure Cu electrode at a scan rate of 5 mV/s in an electrode potential range of −1.1 to −0.3 V and at a scan rate of 20 mV/s in an electrode potential range of −1.1 to −0.7 V.
Figure 8B:
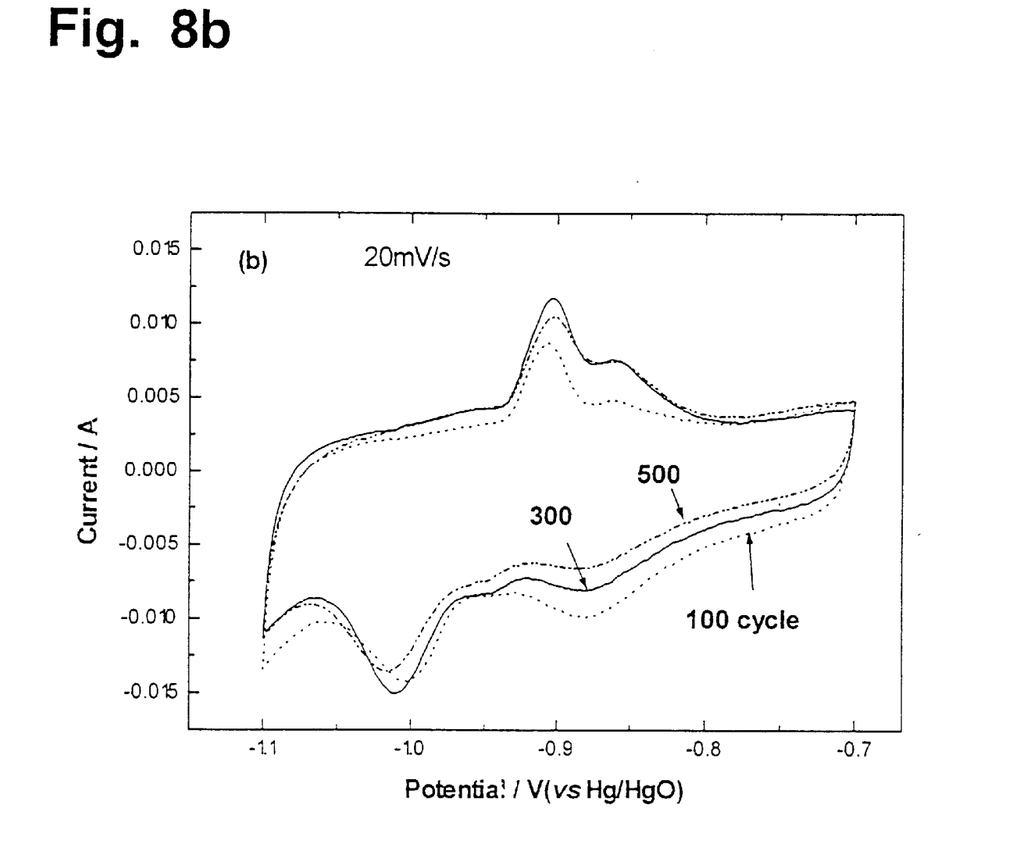

To confirm whether the desolution-deposition of Cu can occur in the range of electrode potentials during cycles of charge and discharge, cyclic voltammetry experiments were done in the potential range of −1.1 to +0.3 V. The results are shown in FIG. 8. As expected from the Pourbaix diagram of FIG. 8a, the desolution-deposition is accomplished between −0.3 V and −0.1 V. The products yielded at this time are believed to be cuprous oxide, and cupric oxide or cupric hydroxide. However, no reaction was observed in the potential range in which the cycles of charge and discharge are practically executed. The cyclic voltammogram of FIG. 8b is obtained by sweeping a pure Cu electrode at a scan rate of 20 mV/s in the range of −1.1 to 0.7 V. As shown, an electrochemical reaction is produced in the range of −0.95 to −0.90 V and the number of peaks is gradually increased with the number of the cycles.

Figure 9A:
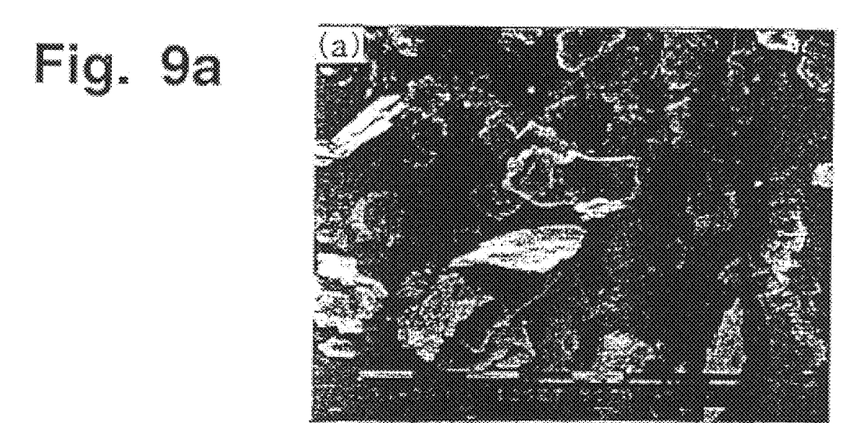
Figure 9B:
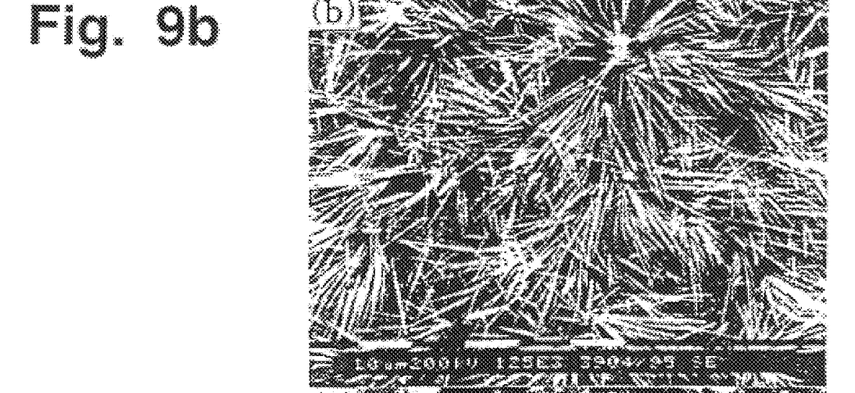
FIGS. 9b and 9c are SEM photographs after many cycles of potential sweeping.
Figure 9C:
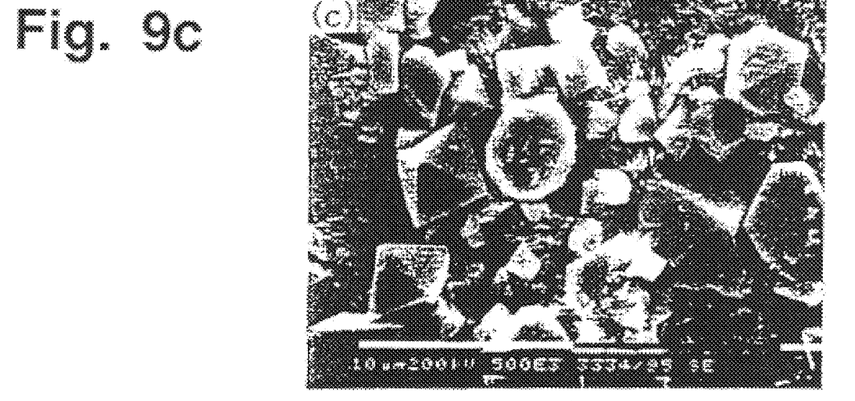

After cycles of potential sweeping, the pure Cu electrodes were imaged by an SEM. The SEM photographs of FIGS. 9a and 9b are for the surfaces of the Cu electrodes after 500 cycles, showing that the peaks read in FIG. 6b are attributed to the desolution-deposition of Cu. Octahedral shapes and needle shapes co-exist for the deposited Cu.

Figure 10:
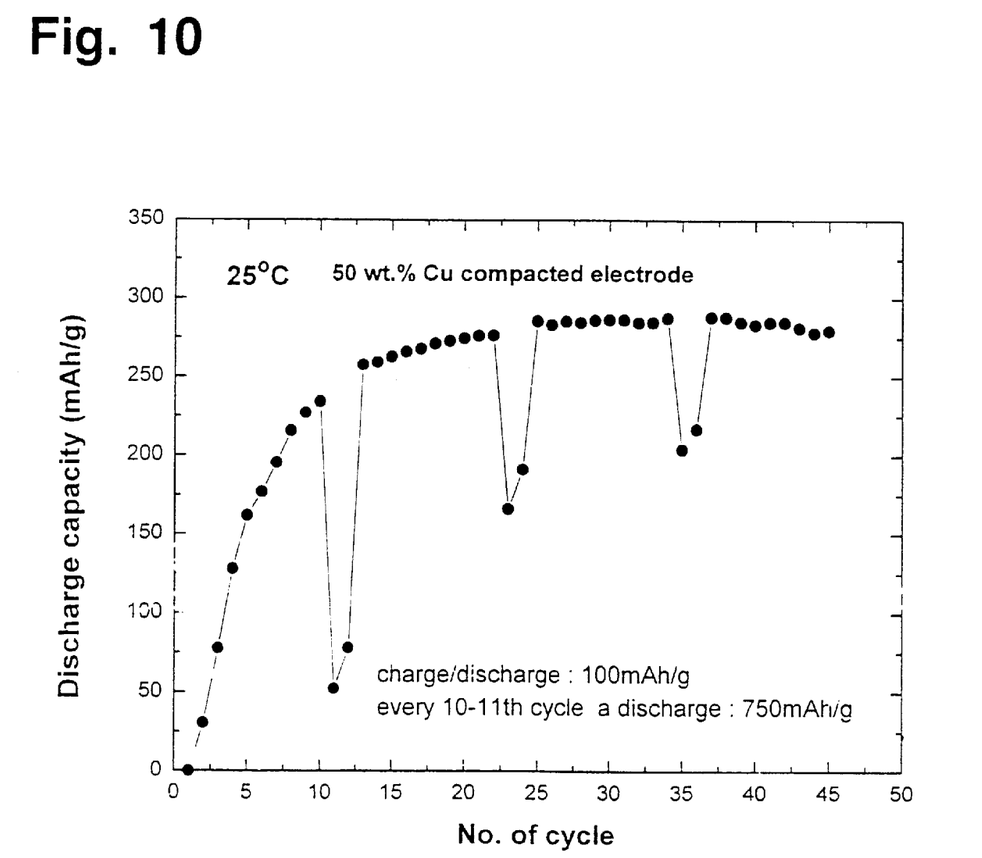
FIG. 10 depicts the discharge capacity of an 50 wt % Cu compacted electrode which is plotted with regard to the number of the cycle of charge and discharge, showing that a high rate dischargeability of 750 mAh/g occurs every 10–11th cycle.

In FIG. 10, the discharge capacity of an 50 wt % Cu compacted electrode is plotted with regard to the number of the cycle of charge and discharge. As seen, a high rate dischargeability of 750 mAh/g occurs every 10–11th cycle. In addition, as the cycle of charge and discharge goes on, the high rate dischargeability gradually increases. After 30 cycles, the property is saturated. Therefore, as the number of the cycle of charge and discharge is increased, the desolution-deposition of Cu is gradually produced. This desolution-deposition of Cu allows Cu to be deposited on the surface of the electrode comprising the hydrogen storage alloy, so that the electrode can be similar to a Cu-plated electrode in surface morphology and the electrode properties including low temperature dischargeability and high rate capability.

A better understanding of the present invention may be obtained in light of the following examples which are set forth to illustrate, but are not to be construed to limit, the present invention.

EXAMPLE 1

Electrodes were prepared with active materials (hydrogen storage alloys), current collectors and binders. As an active material, $Ti_{0.7}Zr_{0.3}Cr_{0.3}Mn_{0.3}V_{0.6}Ni_{0.8}$ was employed. Cu could play the role of a current collector and a binder both. When Ni was used as a current collector, a PTFE powder served as a binder. Such electrode materials were mixed and pressed at a pressure of 10 ton/cm$^2$, to produce pellets. They could function as working electrodes. To measure the properties of the working electrodes, a Pt wire was used as a counter electrode. Hg/HgO was utilized in measuring the potential of the working electrodes.

EXAMPLE II

Pellet electrodes were prepared in the similar manner to that of Example I, except that metal powders, such as $Co_3O_4$ and $Y_2O_3$, are additionally mixed with the active materials, the binders and the current collectors.

The pellet electrodes were tested for the electrode properties including discharge capacity, rate capability, etc.

As described hereinbefore, the method for preparing a high performance anode for Ni/MH secondary cells according to the present invention can be substituted for conventional electroless plating methods and other pre-treatment processes necessary for the preparation of electrodes. The method can give a contribution to the commercialization of the Ni/MH secondary cells utilizing $AB_2$ type hydrogen storage alloy electrodes, which have not been commercialized due to their poor general functions including high rate dischargeability, low temperature current dependence, etc, and to the development of the electric vehicles whose performance is greatly determined by the performance and the capacity of secondary cells.

The present invention has been described in an illustrative manner, and it is to be understood the terminology used is intended to be in the nature of description rather than of limitation.

Many modifications and variations of the present invention are possible in light of the above teachings. Therefore, it is to be understood that within the scope of the appended claims, the invention may be practiced otherwise than as specifically described.

What is claimed is:

1. A method for producing an electrode for Ni/metal hydride alloy secondary cells comprising:

mixing a copper powder with a powder of a metal hydride alloy and cold-pressing said mixture into an electrode, whereby said copper powder in said electrode undergoes a desolution-deposition reaction to modify the surface of the Ni/metal hydride alloy when said electrode is charged and discharged in an electrochemical cell.

2. A method in accordance with claim 1, wherein an additive material selected from the group consisting essentially of $Co_3O_4$, $Y_2O_3$ and the mixtures thereof is also mixed with said copper powder and said powder of said metal hydride alloy.

* * * * *